United States Patent [19]
Fisher et al.

[11] 3,848,620
[45] Nov. 19, 1974

[54] FLUID PRESSURE MODULATOR AND SYSTEM
[75] Inventors: John F. Fisher; Burton S. Zeller, both of Jackson, Mich.
[73] Assignee: Clark Equipment Company, Buchanan, Mich.
[22] Filed: May 14, 1973
[21] Appl. No.: 360,203

[52] U.S. Cl. ............................................. 137/116.3
[51] Int. Cl. ............................................. F16k 31/12
[58] Field of Search .......................... 137/116.3, 115

[56] References Cited
UNITED STATES PATENTS
3,583,422  6/1971  Dach .............................. 137/116.3

Primary Examiner—Edgar W. Geoghegan
Assistant Examiner—William F. Woods
Attorney, Agent, or Firm—Ernst H. Ruf

[57] ABSTRACT

A pressure modulator which upon the application of pressurized fluid achieves a gradual increase to line pressure instead of an abrupt increase. When pressure is applied initially a spool moves and uncovers vent which because of its discharge or bleeding off of fluid produces a low pressure. At the same time, fluid flows through a restricted passageway to an accumulator, and as the pressure builds up in the accumulator it moves the spool back toward its initial position, causing a gradual increase in the pressure. The pressure modulator has characteristics which are particularly advantageous for use in a system for operating a fluid pressure actuated clutch.

10 Claims, 9 Drawing Figures

FLUID PRESSURE MODULATOR AND SYSTEM

BACKGROUND OF THE INVENTION

1. Field of the Invention

This invention relates to a pressure modulator and system which may be utilized to prevent too abrupt application of hydraulic pressure to a device in order to prevent shock or damage to the device or something controlled by it. In many hydraulic systems it is necessary to have sufficient fluid pressure to maintain a hydraulic device properly engaged or in position but it is also important to modulate the pressure build-up. The present invention may be embodied, for example, in a system for operating a fluid pressure actuated clutch in a power shift transmission, but it will be appreciated that it is also useful in other applications.

2. Description of the Prior Art

Various devices and systems have been devised heretofore to modulate the pressure build-up in a hydraulic system. One known arrangement is to use one or more throttling valves in the hydraulic circuit between the pressure source and the pressure actuated device in order to restrict or limit the pressure build-up. A previously used arrangement is to connect an accumulator in circuit between the pressure source and the pressure actuated device. Another known arrangement is to change temporarily the setting of the pressure regulator device which is normally present in many hydraulic circuits, that is, the pressure regulator is temporarily changed to reduce the system or line pressure during the modulation period. Another previous approach to the resolution of the pressure build-up problem is to modify the device which is to be actuated, as for example modifying the piston of the actuator of a multiple disc clutch so that only a portion of the piston is initially exposed to the hydraulic pressure, with the entire piston exposed ultimately in order to provide increased force to maintain the clutch in engagement.

The object of the present invention is to provide a fluid pressure modulator and system which may be readily constructed and proportioned to produce a gradual increase in pressure until the desired line pressure is reached.

SUMMARY OF THE INVENTION

In carrying out our invention in one preferred mode, we utilize a pressure modulator comprising a housing having an elongated opening therein with a closed end. A spool member normally is positioned against the closed end but when pressurized fluid is received in the chamber formed by the spool within the opening it moves away from the closed end of the opening. Such movement of the spool uncovers a vent and temporarily permits the escape of fluid from the chamber in order to maintain a low pressure. At the same time, fluid flows from the chamber through a restricted opening to an accumulator. Pressure gradually builds up in the accumulator, and the pressure in the accumulator is utilized to apply a restoring force on the spool which causes it to move back toward its initial position. This causes the pressure in the chamber gradually to rise.

DESCRIPTION OF THE PREFERRED EMBODIMENT

Figure 1:
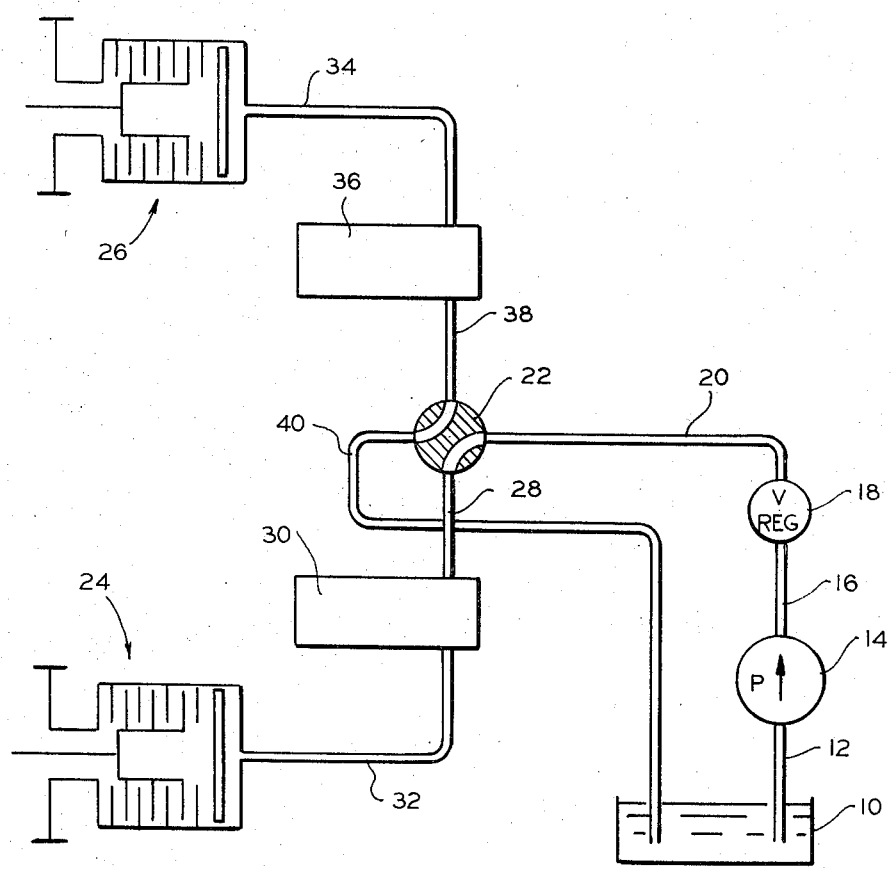
FIG. 1 shows a schematic diagram of a typical hydraulic system of the present invention employing two pressure modulators.

FIG. 1 of the drawing is a diagrammatic illustration of a hydraulic system employing two pressure modulators which may be utilized in the actuation of the forward and reverse clutches respectively of a power shift transmission such as is disclosed and claimed in U.S. Pat. 3,465,609 which is assigned to the same assignee as the present invention. In utilizing such clutches it is desirable to employ a pressure which may for example range from 240 to 280 lbs. per square inch, in order to maintain the clutches firmly in engagement during all operating conditions to which the transmission may be subjected. At the same time, however, it is desirable not to engage the clutches too abruptly but to engage them by a gradual pressure build-up in order to minimize the shock on the gears and other parts of the transmission. The present invention provides for such operation.

In FIG. 1, the numeral 10 indicates a hydraulic reservoir from which fluid is drawn through a conduit 12 by means of the pump 14. The outlet of pump 14 discharges into conduit 16 from which the pressurized fluid goes through the regulator 18 and through conduit 20 to selector valve 22. Valve 22, depending upon its position directs pressurized fluid either to the forward clutch which is indicated at 24 or the reverse clutch which is indicated at 26. When the valve 22 is in the position illustrated in FIG. 1, clutch 24 is pressurized and actuated while fluid is discharged from clutch 26.

When valve 22 is moved to the position indicated in FIG. 1 pressurized fluid flows through conduit 28, through pressure modulator 30 and conduit 32, and on into clutch 24, although it will be understood that it is not essential that the fluid flow through modulator 30. Such modulator could be in a branch circuit connected to conduit 28, 32. When valve 22 is first turned to the position indicated in FIG. 1 fluid is discharged from clutch 26 through conduit 34 and pressure modulator 36, conduit 38, valve 22 and return conduit 40 back to the reservoir 10. It will be readily understood that when valve 22 is turned to the other position clutch 26 is pressurized and clutch 24 is drained to the reservoir.

The following detailed description deals only with pressure modulator 30 and the system in which it is embodied although it will be appreciated that pressure modulator valve 36 is the same.

Figure 2:
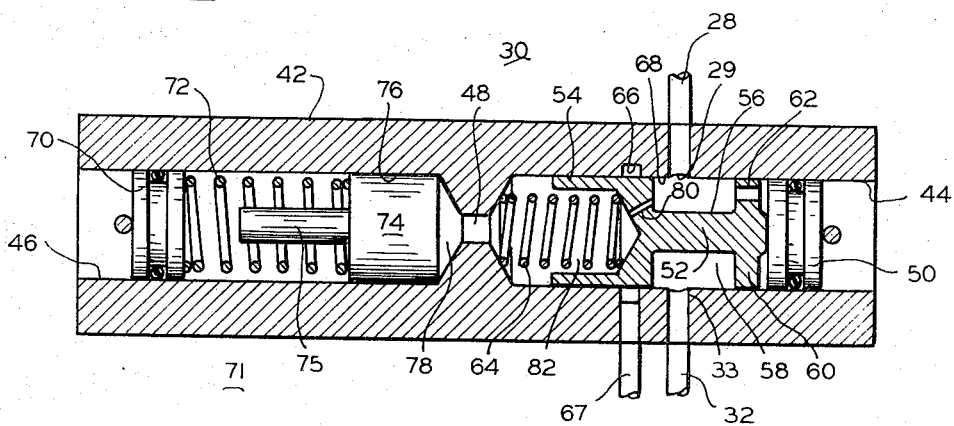
FIG. 2 is a partially schematic sectional view showing the interior of one of such modulators in the quiescent condition.

Referring to FIG. 2, the pressure modulator 30 includes an elongated housing portion 42 having an opening 44 therein in the form of a bore extending in from one end of the housing, and another bore 46 extending in from the other end, with the two bores being joined by a passageway 48 of reduced diameter. A fixed closure member 50 is provided to close the bore 44 near its right end. Conduit 28 is connected with the opening 44 through an inlet port 29 and conduit 32 is similarly connected with the opening through an outlet port 33.

To the left of the closure member 50 and abutting the closure member in the quiescent or inactive condition of the modulator is a spool 52 having a land portion 54 projecting to the left and the reduced diameter center portion 56 which forms a chamber 58 between land portion 54 and closure member 50. There is also a land portion 60 near the right end of the spool 52 but this is provided, in this first embodiment with a passage as indicated at 62; passage 62 is large enough to provide for essentially unrestricted flow of hydraulic fluid back and forth between the two sides of land portion 60 so that in effect a single variable volume chamber 58 is formed between closure member 50 and land portion 54 on the spool. To hold the spool 52 to the right against closure member 50 in the quiescent position and resist movement of spool 52 to the left a compression coil spring 64 is provided; spring 64 also has other purposes as described hereinafter.

There is a vent in the form of an annular groove 66 in the inner surface 68 of the housing 42 and this groove is connected to a vent line 67 which directs fluid which enters the groove 66 back to the reservoir.

Also included as a part of the modulator 30 is a second closure member 70 for the outer end of bore 46. A compression spring 72 is located between member 70 and a movable piston member 74 which is movable with respect to the inner wall or surface 76 of the left hand bore and suitably sealed to provide an accumulator which is indicated generally by the numeral 71. That is, as pressurized fluid enters the chamber indicated at 78 it forces the piston 74 to the left and compresses spring 72 as the volume of chamber 78 increases. It will be appreciated that other equivalent types of accumulators can be used, the essential requirement being a device which receives pressurized fluid and retains such fluid at increasing pressure until the maximum volume is reached.

The build up of pressure in chamber 78 is gradual and occurs as a result of fluid flow from chamber 58 through a restricted opening 80 in spool 52, and thence through another chamber 82 and passageway 48 and on into the accumulator 71. It will be appreciated that the rate of flow into the accumulator is determined by the size of opening 80, and that the rate of pressure increase is determined by the characteristic of spring 72.

Figure 3:
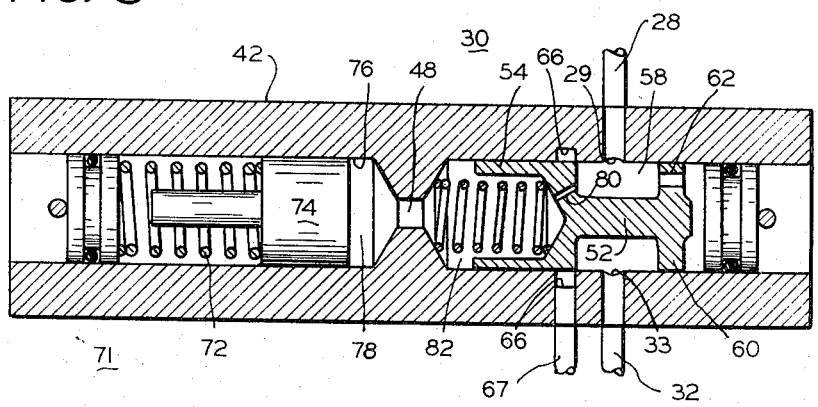
FIG. 3 shows the modulator of FIG. 2 in an operating condition.
Figure 4:
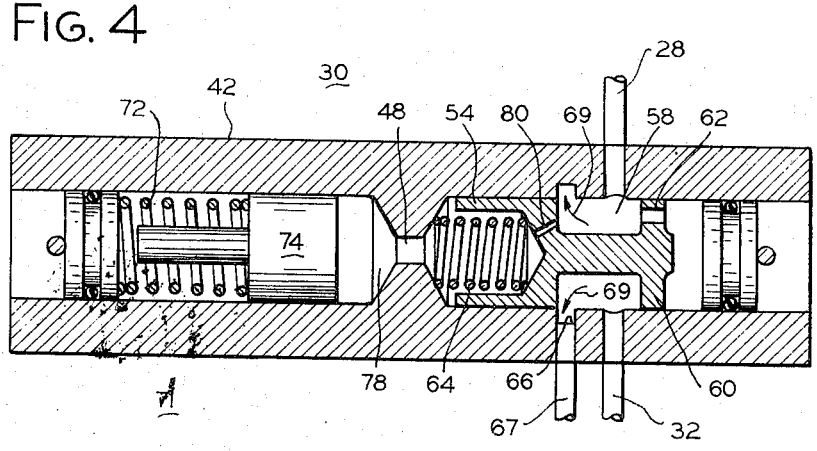
FIG. 4 shows the same modulator in another operating condition.

In the operation of modulator 30, valve 22 is turned to the position indicated in FIG. 1 whereupon pressurized hydraulic fluid, the pressure of which is normally maintained at line pressure by regulator 18, is admitted through conduit 28 into chamber 58. This pressurized fluid causes spool 52 to move to the left, compressing spring 64, and FIG. 3 shows a transitory position of the spool, after some initial movement, in which the land portion 54 is just about to uncover vent opening 66. As movement of spool 52 conintues to the left, the position indicated in FIG. 4 is reached in which fluid is discharged through the vent 66, 67 as illustrated by the arrows 69 in FIG. 4.

The spring 64 is such that in the typical modulator being described it provides sufficient force resisting movement of spool to the left, or in other words, urging spool 52 to the right, that it produces a pressure drop or differential between inlet port 29 and vent 66, 67 of 10–20 lbs. per square inch during venting operation. Such pressure differential is necessary for the operation of the accumulator portion of the modulator and the force of the spring 64 also is essential for another purpose which is described hereinafter. When pressurized fluid is admitted into chamber 58, a portion of such fluid flows through restricted opening 80 and through chamber 82 into the accumulator 71, because of the mentioned pressure differential, moving piston 74 of the accumulator to the left and compressing spring 72. As this action occurs, the pressure gradually increases in the accumulator and in chamber 82 and the force on spool 52 resulting from this pressure, plus the force of spring 64, moves spool 52 back to the right, causing a pressure build-up in chamber 58 and also in conduit 32 and in clutch 24 which is supplied by conduit 32.

Figure 5:
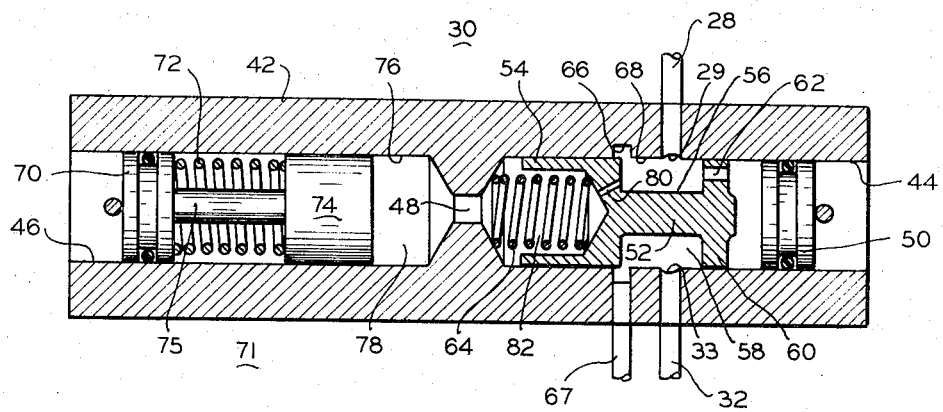
FIG. 5 shows the same modulator in another operating condition.

FIG. 5 shows the positions of the various parts of the modulator during one of the transitory conditions described. The projection 75 on the back of piston 74 of the accumulator has bottomed against stop member 70, meaning that accumulator 71 has reached its maximum volume and spool 52 has moved back a small amount toward the right, partially covering the vent 66. It will be seen by referring to FIGS. 2, 3, 4, and 5 in sequence that the accumulator piston 74 has gradually moved from right to left during the sequence of operations described.

Figure 6:
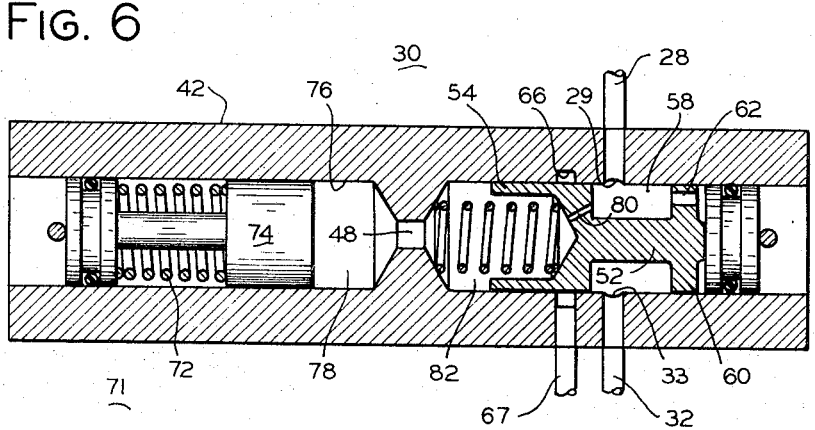
FIG. 6 shows the same modulator in still another operating condition.

FIG. 6 shows the condition in which spool 52 has moved completely back to the right to its initial position, while accumulator 71 remains in its fully open condition. This is the normal operating condition for the clutch or other device to which the modulator is connected, and FIG. 8 to be described illustrates the relation of pressure and time to the positions of various parts of the modulator during the just described modulating operation.

Figure 8:
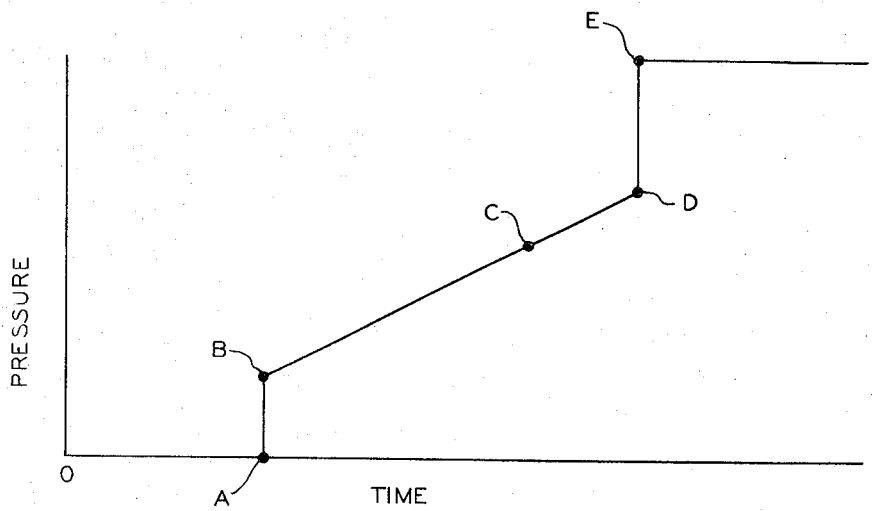
FIG. 8 is a graph showing a typical pressure time relationship for the modulator of FIGS. 2 through 6 inclusive.

Referring to FIG. 8, the pressure is plotted along the ordinate and the time along the abscissa, and the resulting curve illustrates a typical pressure-timee relationship for the embodiment of the modulator and system heretofore described. Starting at zero in FIG. 8, when valve 22 is operated to admit pressurized fluid through conduit 28 into modulator 30 and on through conduit 32 into clutch 24, the pressure for the first increment of time is negligible and the fluid flows through modulator 30 and on into the clutch 24 for this time interval which continues to the point indicated at A. At this point the system is sufficiently filled so that the pressure rises in chamber 58 an amount sufficient to overcome the force of spring 64 and move spool 52 to the left to open vent 66 and bleed off a portion of the pressurized fluid entering through valve 22. Point B on the graph illustrates the time and the pressure at which the opening of vent 66 occurs. Then, the accumulator fills and the system pressure increases along the line BD. Point C illustrates a typical full engagmeent point for a fluid pressure actuated clutch and as the pressure passes this point the clutch 24 becomes fully engaged, however, the pressure continues to increase to D, at which time the spool 52 is between the positions illustrated in FIGS. 5 and 6, namely, in a osition at which it cuts off the vent 66. As far as spool 52 is concerned, the position of the spool at this point D is the same as illustrated in FIG. 3, although it will be appreciated that other conditions in the system are not the same.

When the vent 66 is cut off at point D by the return motion of the spool 52 the pressure immediately rises quickly to point E on the graph of FIG. 8 which is the full line pressure as maintained by regulator 18. It will be appreciated that this pressure provides an extra margin equal to the difference in pressures between points C and E to hold the clutch firmly in engagement in spite of shock loads and other operating conditions.

It will be appreciated that it is possible readily to change the slope of line BD merely by utilizing a different spring 72 for the accumulator. Thus, since line BD is a straight line it is easy to adjust the system to provide for desired changes in either the pressure or time of full engagement of the clutch, or both.

Figure 7:
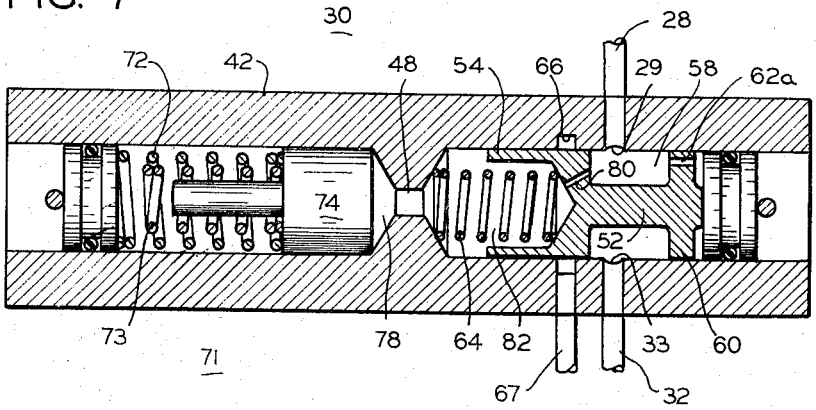
FIG. 7 shows a modified modulator.

FIG. 7 shows another preferred embodiment of the invention which has two significant differences from the first embodiment previously described. The modulator in FIG. 7 is shown in the quiescent position comparable to the position of FIG. 2 for the first embodiment.

One difference between the modulator of FIG. 7 and the first embodiment is that there is a restricted passage 62a through the right hand land portion of spool 52 instead of the unrestricted passage 62 of the first embodiment. It will be appreciated that the effect of this is that when pressurized fluid is admitted to chamber 58 there is a delay in the movement of the spool 52 to the left because the restricted passage 62a requires more time for the pressurized fluid to pass through such passage and get to the right end of spool 52 and move it toward the left. The result of this is illustrated in the graph of FIG. 9 which is explained hereinafter.

The other difference in the embodiment of FIG. 7 is that there is a double spring for the accumulator which includes spring 72 and an additional spring 73. It will be appreciated that it is possible to change the characteristic of a spring or a group of springs in various ways, such as by using two or more springs or by suitable design and construction of a special single spring and the pair of springs 72, 73 of FIG. 9 are intended to illustrate generally the use of one or more springs with other than a straight line characteristic in the accumulator 71 illustrated or in an equivalent accumulator.

Figure 9:
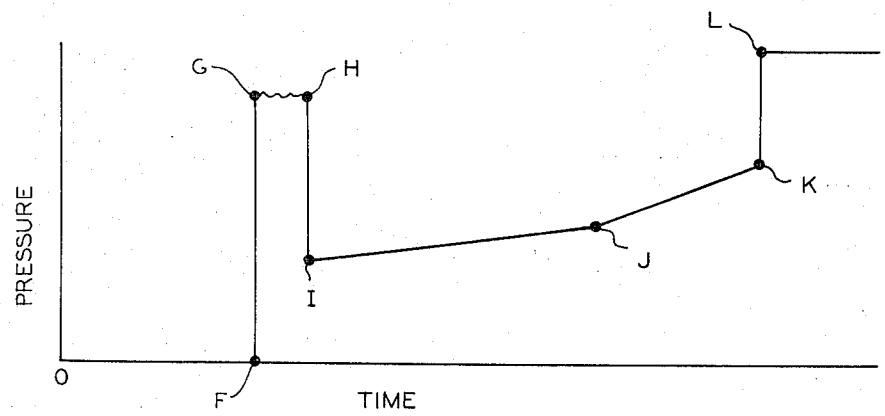
FIG. 9 shows a pressure time graph for the modified modulator illustrated in FIG. 7.

The effect of the two changes mentioned for the embodiment of FIG. 7 is apparent from FIG. 9 which is a curve showing a pressure time relationship for a modulator and system such as that illustrated by FIG. 7. In this case, when valve 22 is first operated to admit pressurized fluid to the modulator there is an initial fluid flow with negligible pressure and this is illustrated by the line from zero to point F. At point F a pressure surge begins which extends up to point G over to point H after which the pressure drops down to point I. This is the result of the delayed operation of spool 52 as described. That is, the pressure in the system rises to a peak at G and continues at approximately such peak pressure over to point H at which time spool 52 moves, after the delay which was discussed, and the system pressure then drops down to point I. Thereafter, the pressure increase in the system moves first up into point J and then up to point K, the curve in this case showing two straight line portions representing symbolically the operation of the two springs 72 and 73. As in the other embodiment, when the spool 52 during its return stroke closes off the vent 66 the pressure rises abruptly to line pressure and this is illustrated by the line K-L on the graph of FIG. 9.

In many systems for operating hydraulic clutches and other devices, it is desirable to have a pressure surge such as illustrated at F, G, H, and I in FIG. 9 in order to provide for filling the clutch or other device more quickly. It will be appreciated the occurrence of a higher pressure at this point in the operation concomitantly produces a greater volume of fluid flow and consequently more rapid filling, and this is particularly useful when line 32 for example is of considerable length or when the fluid pressure actuator of the clutch is of considerable volume and consequently requires a substantial amount of fluid to fill it before the actual clutch application can occur.

It will be recognized that there are other equivalent ways of achieving a pressure surge near the beginning of the operation. For example, it would be possible to move the vent 66 farther away from the chamber 58 in the right hand position of the spool 57 so that greater movement of spool 52 would be required in order to uncover the vent.

It will be appreciated also that the use of multiple springs or variable rate springs is useful to adjust the pressure-time relationship in order to accurately time the clutch engagement that is, to determine the time when the system pressure increase reaches the pressure at which the clutch is fully engaged.

It will be appreciated that during engagement of clutch 24 the accumulator spring 72 (or springs 72 and 73) remains fully compressed reflecting the line pressure which is present in chamber 58 and in the accumulator. When clutch 24 is disengaged fluid is discharged from it in whole or in part. Similarly at least enough fluid is discharged from accumulator 71 that the accumulator is restored to the condition of FIG. 2, and the spring 64 holds the spool 52 to the right in readiness for another operating cycle as described.

It will be appreciated that modifications may be made in our invention. For example, the restrictive opening 80 can be in the sidewall of the housing 42 if desired and the accumulator 71 can be external to the housing 42 without departing from the present invention. Anothe modification is to eliminate reduced diameter passageway 48 from the construction illustrated in the drawing and combine chambers 78 and 82 into a single chamber forming a portion of the accumulator but also acting upon spool 52; in such a modification the left hand spring 64 is secured in a known manner to the housing 42 in a location where it does not interfere with the operation of piston 74. Accordingly, it should be understood that we intend to cover by the appended claims all modifications falling within the true spirit and scope of our invention.

I claim:

1. In a system for actuating a fluid pressure operated device, in combination:

a. a pressure modulator including a housing having an elongated, substantially uniform diameter opening therein with a closed end, a spool member movable within said opening, a first land portion on said spool member near said closed end and having an aperture therethrough, a second land portion on said spool member, spaced from said first land portion and forming with the inner surface of said opening and said closed end, via said first land portion aperture, a variable volume substantially uniform diameter chamber, a fluid inlet port communicating with said chamber and arranged to admit pressurized fluid to the chamber, a fluid outlet port operatively connecting said chamber with said device, a vent in said housing connected with said opening, one end of said spool member abutting the said closed housing end when said modulator isn in a quiescent position and means for resisting an increase in the volume of said chamber, the said spool member being arranged to move away from the said closed housing end in response to an increase in fluid pressure in the said chamber, the said vent being arranged to be normally covered by the said second land portion and to be uncovered when the said spool member moves more than a predetermined distance, with the said land portions being spaced apart in a manner so as to permit the regulation of fluid pressure by controlling only the fluid volume outflow from said chamber;

b. an accumulator including another housing having another elongated opening and having another closed end, a piston movable within said another opening, resilient means interposed between said another closed end and said piston and a passageway between said modulator and accumulator permitting only fluid communication between said accumulator and said modulator chamber, whereby an increase in pressure in the said chamber, to an amount above a predetermined value, causes said spool member to uncover said vent port and an increase in pressure in said chamber causes a build-up of pressure in said accumulator; and c. multiple bias means responsive to the said build-up of pressure in said accumulator causing said spool member to move back again toward its quiescent position.

2. The combination as claimed in claim 1 wherein said build-up pressure in said chamber is gradual by reason of said piston compressing said resilient means against said another closed housing end.

3. The combination as claimed in claim 1 in which said multiple bias means responsive to the build-up of pressure in said accumulator causing the spool member to move back again to its quiescent position, includes a second chamber within said modulator, said second chamber having one land portion of the said spool member as a portion thereof.

4. The combination as claimed in claim 3, in which the said means for resisting an increase in the volume of the said chamber includes a compression spring located in the second chamber.

5. The combination as claimed in claim 3, with the addition of a restricted opening connecting the first said chamber and the second said chamber.

6. The combination as claimed in claim 5 wherein said restricted opening is in said spool member.

7. The combination as claimed in claim 3 wherein said aperture has a restricted passage for momentarily delaying the opening of said fluid discharge vent, whereby to produce a pressure surge followed by a drop to a lower pressure in the said first chamber.

8. The combination as claimed in claim 1 wherein said multiple bias means responsive to the build-up of pressure in the said accumulator causing the spool member to move back again to its quiescent position is operative in conjunction with the said means for resisting an increase in the volume of said chamber, for completely shutting off said vent.

9. The combination as claimed in claim 1 wherein said spool member land portions are sufficiently spaced apart to allow full interconnection between said inlet and outlet ports regardless of the postion of said spool member.

10. The combination as claimed in claim 1 wherein said resilient means comprises multiple compression springs for producing other than a single straight line response characteristic.

* * * * *